No. 731,385. Patented June 16, 1903.

UNITED STATES PATENT OFFICE.

PAUL ERWIN OBERREIT, OF LUDWIGSHAFEN-ON-THE-RHINE, GERMANY, ASSIGNOR TO BADISCHE ANILIN UND SODA FABRIK, OF LUDWIGSHAFEN-ON-THE-RHINE, BAVARIA, GERMANY, A CORPORATION.

PROCESS OF MAKING INDOXYL.

SPECIFICATION forming part of Letters Patent No. 731,385, dated June 16, 1903.

Application filed March 31, 1903. Serial No. 150,465. (No specimens.)

*To all whom it may concern:*

Be it known that I, PAUL ERWIN OBERREIT, doctor of philosophy and chemist, a subject of the King of Saxony, residing at Ludwigshafen-on-the-Rhine, in the Kingdom of Bavaria, Empire of Germany, have invented new and useful Improvements in Processes of Making Indoxyl, of which the following is a specification.

In the production on the large scale of indoxylic acid or indoxyl by acting with caustic alkali on phenyl-glycin-ortho-carboxylic acid the reacting materials are intimately mixed at ordinary temperature by grinding, (care being taken to exclude water, as far as possible, from the materials, both before and during mixing,) and the mixture is then heated. This grinding is, however, a tedious, expensive, and at times uncertain operation, so that attempts have been made to dispense with it by mixing the materials in aqueous solution and evaporating off the water. Under these circumstances, however, a partial decomposition of the phenyl-glycin-ortho-carboxylic acid takes place, so that but little indoxyl is obtained from the melt.

I have discovered that an aqueous solution of phenyl-glycin-ortho-carboxylic acid and caustic alkali can advantageously be employed for the production of indoxylic acid and indoxyl if the mixture be heated in a vacuum. The water evaporates without decomposition of the glycin salt taking place, and condensation to indoxylic acid or indoxyl is smoothly effected.

The following examples will serve to illustrate the nature of my invention, which, however, is not confined to these examples. The parts are by weight.

Example 1: Mix a solution of twenty-four (24) parts of phenyl-glycin-ortho-carboxylic acid disodium salt in one hundred (100) parts of water with one hundred and fifty (150) parts of caustic-soda lye, containing about thirty-five (35) per cent. NaOH, and evaporate the mixture *in vacuo*. Finally heat the whole to a temperature of over two hundred degrees centigrade, (200° C.)

Example 2: Mix into a paste one hundred and ninety-five (195) parts of phenyl-glycin-ortho-carboxylic acid and four hundred (400) parts of water. To this add gradually a mixture of thirteen hundred (1,300) parts of caustic-potash lye, containing about twenty-eight (28) per cent. KOH, and eight hundred and fifty (850) parts of caustic-soda lye, containing about twenty-four (24) per cent. NaOH. Evaporate the whole in a vacuum and finally heat the mass, while stirring, to a temperature of about two hundred and fifty degrees centigrade (250° C.) until indoxyl practically ceases to be formed.

I claim—

The process for the production of indoxylic acid and indoxyl by mixing phenyl-glycin-ortho-carboxylic acid with caustic alkali in presence of water and heating the mixture in a vacuum until the desired condensation has been effected.

In testimony whereof I have hereunto set my hand in the presence of two subscribing witnesses.

PAUL ERWIN OBERREIT.

Witnesses:
   JOHN L. HEINKE,
   JACOB ADRIAN.